US011417900B2

(12) United States Patent
Kim et al.

(10) Patent No.: US 11,417,900 B2
(45) Date of Patent: Aug. 16, 2022

(54) REDOX FLOW BATTERY

(71) Applicant: Standard Energy Inc., Daejeon (KR)

(72) Inventors: Bugi Kim, Sejong (KR); Kihyun Kim, Daejeon (KR); Bumhee Cho, Daejeon (KR); Damdam Choi, Daejeon (KR)

(73) Assignee: Standard Energy Inc., Daejeon (KR)

( * ) Notice: Subject to any disclaimer, the term of this patent is extended or adjusted under 35 U.S.C. 154(b) by 308 days.

(21) Appl. No.: 16/603,198

(22) PCT Filed: Jan. 12, 2018

(86) PCT No.: PCT/KR2018/000578
§ 371 (c)(1),
(2) Date: May 14, 2020

(87) PCT Pub. No.: WO2018/190496
PCT Pub. Date: Oct. 18, 2018

(65) Prior Publication Data
US 2020/0287226 A1 Sep. 10, 2020

(30) Foreign Application Priority Data
Apr. 10, 2017 (KR) .................. 10-2017-0045932

(51) Int. Cl.
*H01M 8/04276* (2016.01)
*H01M 8/04186* (2016.01)
(Continued)

(52) U.S. Cl.
CPC ... *H01M 8/04276* (2013.01); *H01M 8/04186* (2013.01); *H01M 8/04201* (2013.01);
(Continued)

(58) Field of Classification Search
CPC ........ H01M 8/04276; H01M 8/04186; H01M 8/04201; H01M 8/04753; H01M 8/188
(Continued)

(56) References Cited

U.S. PATENT DOCUMENTS

2005/0158615 A1* 7/2005 Samuel ............. H01M 8/04119
429/81
2007/0037034 A1 2/2007 Fisher et al.
(Continued)

FOREIGN PATENT DOCUMENTS

JP 2006-093016 4/2006
JP 2009-016218 1/2009
(Continued)

OTHER PUBLICATIONS

International Search Report dated Apr. 16, 2018 in PCT Application No. PCT/KR2018/000578.

*Primary Examiner* — James M Erwin
(74) *Attorney, Agent, or Firm* — Knobbe, Martens, Olson & Bear, LLP (57) ABSTRACT

The present invention relates to a redox flow battery comprising: a battery module including a battery cell, an electrolyte tank, an electrolyte flow path, and an electrolyte transfer part; and an electrolyte control unit for controlling electrolyte flow of the battery module, wherein the redox flow battery comprises one or more battery modules, and is charged or discharged by an electrolyte independently circulated through every battery module or every predetermined number of battery modules by the electrolyte control unit.

14 Claims, 8 Drawing Sheets

(51) Int. Cl.
*H01M 8/04082* (2016.01)
*H01M 8/04746* (2016.01)
*H01M 8/18* (2006.01)

(52) U.S. Cl.
CPC ....... *H01M 8/04753* (2013.01); *H01M 8/188* (2013.01); *H01M 2250/402* (2013.01)

(58) Field of Classification Search
USPC .......................................................... 429/81
See application file for complete search history.

(56) References Cited

U.S. PATENT DOCUMENTS

| | | | | |
|---|---|---|---|---|
| 2014/0057141 A1* | 2/2014 | Mosso | ................. | H01M 8/188 |
| | | | | 429/51 |
| 2014/0199564 A1* | 7/2014 | Tang | ................... | H01M 8/0432 |
| | | | | 429/50 |
| 2015/0349357 A1 | 12/2015 | Braithwaite et al. | | |
| 2016/0181640 A1* | 6/2016 | Kaku | ................... | H01M 8/188 |
| | | | | 429/498 |

FOREIGN PATENT DOCUMENTS

| | | |
|---|---|---|
| KR | 10-2000-0012125 | 2/2000 |
| KR | 10-2002-0093929 | 12/2002 |
| KR | 10-2007-0087120 | 8/2007 |
| KR | 10-2011-0119775 | 11/2011 |
| KR | 10-1176126 | 8/2012 |
| KR | 10-2013-0140342 | 12/2013 |
| KR | 10-1394255 | 5/2014 |
| KR | 10-2015-0047529 | 5/2015 |
| KR | 10-2017-0005630 | 1/2017 |
| KR | 10-1803825 | 12/2017 |
| KR | 10-1803824 | 1/2018 |
| WO | WO 2018/190496 A1 | 10/2018 |

* cited by examiner

REDOX FLOW BATTERY

TECHNICAL FIELD

The present invention relates to a redox flow battery that is charged and discharged as the electrolyte is circulated.

More specifically, the present invention relates to a redox flow battery, which has at least one battery module including a battery cell, an electrolyte tank, an electrolyte flow path, and an electrolyte transfer part in which the electrolyte flows, and further has an electrolyte control unit controlling the flow of the electrolyte, whereby each of the battery modules is charged and discharged by independently circulating an electrolyte.

BACKGROUND ART

Recently, renewable energy, such as solar energy and wind energy, has been spotlighted as a method of suppressing greenhouse gas emission, which is a major cause of global warming, and much research is being carried out for practical use thereof. However, renewable energy is greatly affected by the site environment and natural conditions. Moreover, there is a disadvantage in that renewable energy cannot supply energy evenly continuously because the output fluctuates severely.

Therefore, in order to produce renewable energy for use in homes or commercially, a system that stores energy when the output is high and uses the stored energy when the output is low is being used.

A large capacity secondary battery is used as such an energy storage system. For example, the large capacity secondary battery storage system is introduced in a large-scale photovoltaic and wind plant. The secondary battery for storing a large amount of power includes a lead acid battery, a sodium sulfide (NaS) battery, a redox flow battery (RFB), and the like.

These redox flow batteries have features of operating at room temperature and enabling independent design of capacity and output, and thus much research thereon has been conducted as large capacity secondary batteries.

The redox flow battery is provided so that a membrane, an electrode, and a bipolar plate are arranged in series to form a stack, and functions as a secondary battery capable of charging and discharging electrical energy. The redox flow battery is provided so that the anode and cathode electrolytes supplied from the anode and cathode electrolyte storage tanks on both sides of the bipolar plate are circulated to perform ion exchanges, and in this process, the movements of the electrons occur to perform charging and discharging. Such a redox flow battery is known to be most suitable for an energy storage system (ESS) because the redox flow battery has a longer lifespan compared with the existing secondary battery and can be manufactured in all medium and large systems of kW to MW class.

However, the redox flow battery is configured so that the tanks for storing the anode and cathode electrolytes are separately arranged at a predetermined spacing (for example, the electrolyte tanks are arranged at a predetermined spacing in both sides or the bottom of the stack). Due to the electrolyte circulation pipe connecting the tank and the electrolyte tank, there is a disadvantage in that the overall volume of the system is relatively large compared to other power storage devices such as lead acid batteries, lithium ion batteries, and lithium-sulfur batteries having a similar power storage capacity.

In addition, since a plurality of electrolyte circulation tubes are connected to the stack, the pump and the electrolyte tank must be provided, and a pump capacity of a certain level or more is required to supply electrolyte to each stack uniformly. There are problems that as the length of the electrolyte circulation tube is increased, the required capacity of the pump is increased so that the size of the pump and the manufacturing cost of the battery are increased, and as the power consumption is increased due to the increase in the pump capacity, the overall battery efficiency is reduced.

In addition, the general battery should have fast response to the charging and discharging operation. However, when the redox flow battery is operated for charging and discharging in a stopped state, it takes time for the electrolyte to circulate into the stack using the pump, whereby there are problems that the response is delayed as much as the required time and the cost increases because a large amount of chemical-resistant piping is required to connect the cell, the stack, and the pump.

A typical redox flow battery is provided so that the electrolyte is supplied to each battery cell through a manifold. However, the electrolyte filled in the manifold serves as an electric path connecting each cell, which may be a path of electron movement. Through this path, a shunt current is generated, and a part of the energy is lost due to the shunt current during charging and discharging, which results in the main cause of reduced efficiency, component damage, and uneven cell performance. The method of increasing the manifold length and narrowing the cross-sectional area has been mainly adopted to reduce the shunt current in the related art. However, since the method increases the flow resistance of the fluid and the pumping loss, there is a need for a method to overcome the same.

RELATED DOCUMENTS

Patent Documents

Korean Patent Publication No. 10-2011-0119775 (Nov. 2, 2011)

Korean Patent No. 10-1176126 (Oct. 26, 2011)

DISCLOSURE

Technical Problem

The present invention has been made keeping in mind the above problems occurring in the related art, and an objective of the present invention is to provide a redox flow battery that has one or more battery modules including a battery cell, an electrolyte tank, and an electrolyte flow path through which the electrolyte flows; and an electrolyte control unit controlling the flow of the electrolyte, thereby reducing the reaction time, minimizing the occurrence of shunt current, and improving the efficiency.

In addition, another objective of the present invention is to provide a redox flow battery that includes a diaphragm controlling pressure inside an electrolyte transfer part, the diaphragm being repeatedly pressurized by the electrolyte control unit to control the pressure inside the electrolyte transfer part, whereby each of the battery modules is charged and discharged by individually circulating the electrolyte.

Technical Solution

In order to achieve the above objectives, a redox flow battery according to the present invention is configured to include one or more battery modules each including a battery cell, an electrolyte tank, an electrolyte flow path, and an electrolyte transfer part; and an electrolyte control unit controlling electrolyte flow of the battery module, wherein each of the battery modules is charged and discharged by independently circulating an electrolyte for each of the battery modules or a predetermined number of battery modules through the electrolyte control unit.

Advantageous Effects

The present invention has an advantage that a redox flow battery has one or more battery modules including a battery cell, an electrolyte tank, and an electrolyte flow path through which the electrolyte flows; and an electrolyte control unit controlling the flow of the electrolyte, whereby each of the battery modules is charged and discharged by independently circulating an electrolyte.

In addition, according to the present invention, a redox flow battery includes a diaphragm controlling pressure inside an electrolyte transfer part, the diaphragm being repeatedly pressurized through the electrolyte control unit to control the pressure inside the electrolyte transfer part, whereby a closed structure composed of battery cell, electrolyte tank, electrolyte flow path, and electrolyte transfer part is provided, thereby reducing the response time, minimizing the occurrence of shunt current, and improving the efficiency, and each of the battery modules is charged and discharged by individually circulating the electrolyte.

BEST MODE

Advantages and features of the embodiments of the present invention, and methods of achieving them will be apparent with reference to the embodiments described below in detail with the accompanying drawings. However, the present invention is not limited to the embodiments disclosed below, but can be implemented in various different forms. The embodiments are to make the disclosure of the present invention complete and are provided to fully inform the scope of the invention to those skilled in the art to which the present invention pertains. The invention is defined only by the scope of the claims. Like reference numerals refer to like elements throughout.

Upon describing the embodiments of the present invention, if it is determined that a detailed description of a known function or configuration may unnecessarily obscure the gist of the present invention, the detailed description thereof will be omitted. Terms and words used in the present specification and claims are terms defined in consideration of functions in the embodiments of the present invention, and should not be construed as being limited to ordinary or dictionary meanings. It should be interpreted as meaning and having a concept corresponding to the technical idea of the present invention based on the principle that the concept of the term can be properly defined in order to explain in the best way.

Therefore, since the embodiments described in the present specification and the configuration shown in the drawings are only the most preferred embodiments of the present invention and do not represent all of the technical idea of the present invention, it should be understood that there may be various equivalents and variations capable of being substituted therefor at the time of the present application.

Before describing the present invention with reference to the drawings, it should be appreciated that matters that are not necessary to reveal the gist of the present invention, that is, well-known configurations that could be obviously added by those skilled in the art will not be shown or described in detail.

A redox flow battery according to the present invention is provided with at least one battery module including a battery cell, an electrolyte tank, an electrolyte flow path, and an electrolyte transfer part in which the electrolyte flows, and further provided with an electrolyte control unit for controlling the flow of the electrolyte, whereby each of the battery modules is charged and discharged by independently circulating an electrolyte.

The redox flow battery according to the present invention is devised to overcome a problem that the length of the electrolyte circulation tube is increased and thus the volume of the battery itself is increased, which is a disadvantage of the redox flow battery, a physical problem that a high performance pump is required or the number of pumps is increased, a problem that the size of the pump and the manufacturing cost of the battery are increased due to the transfer of electrolyte, and a problem that the responsiveness is reduced and pumping loss occurs, the redox flow battery having one or more battery modules 10 consisting of a battery cell 110, an electrolyte tank 120, an electrolyte flow path 130, and an electrolyte transfer part 140 provided on a stack 10, and having an electrolyte control unit 200 that controls such that the electrolyte transfer part 140 is operated to cause the electrolyte to be circulated, whereby each of the multiple battery modules 100 is charged and discharged by independently circulating the electrolyte. Thus, the present invention can significantly reduce the moving distance of the electrolyte, and can efficiently solve problems such as delayed response, pumping loss, and the like.

First, a battery cell 110 provided in a battery module 100 herein means a minimum unit in which charging and discharging are performed through the electrolyte.

In addition, a stack 10 herein means that one or more battery cells 110 are provided, in which multiple battery cells 110 are stacked or configured.

Hereinafter, with reference to the accompanying drawings, the redox flow battery according to the present invention will be described in detail.

Figure 1:
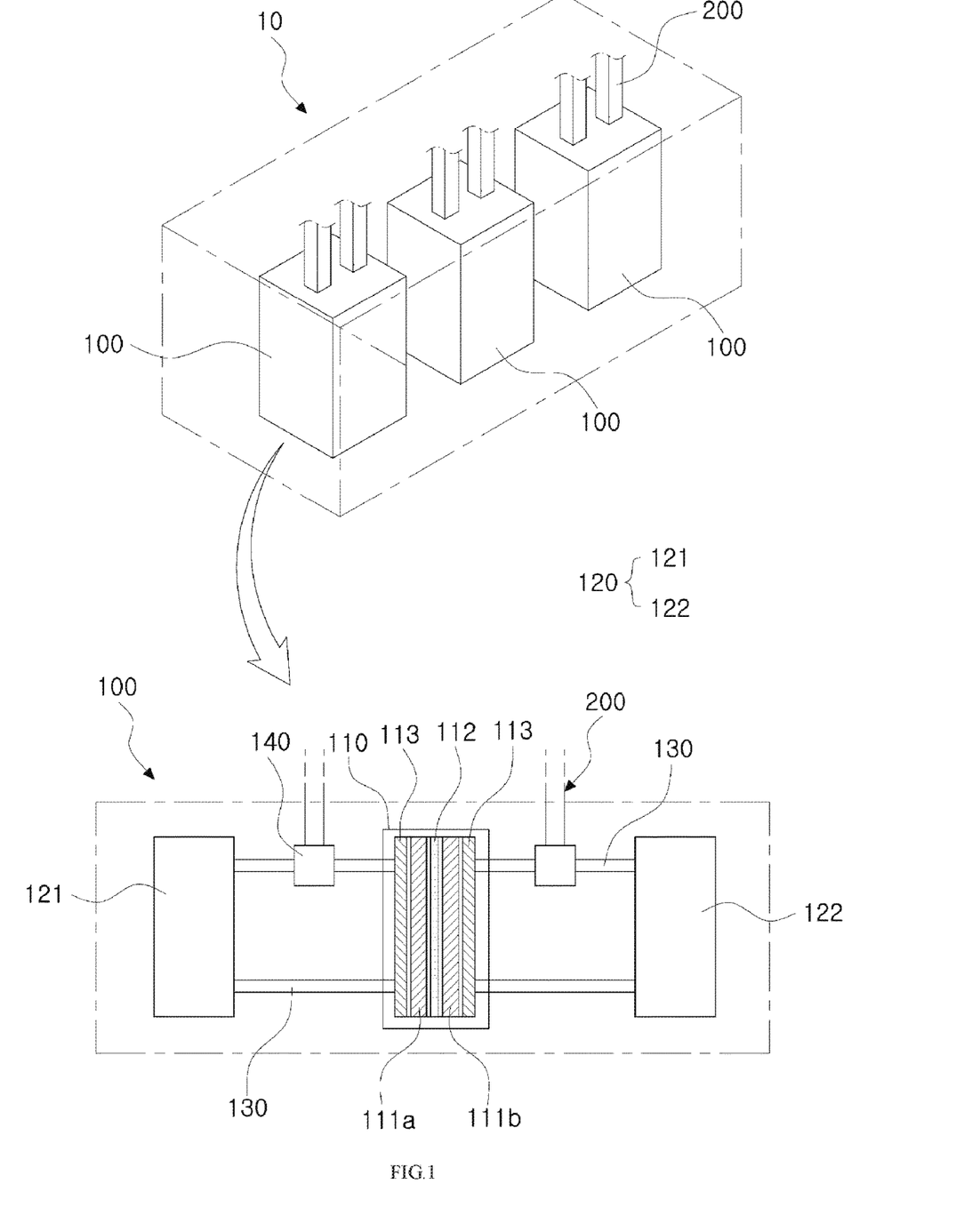
FIG. 1 is a view illustrating an example in which multiple battery modules are provided in a redox flow battery according to the present invention.
Figure 2:
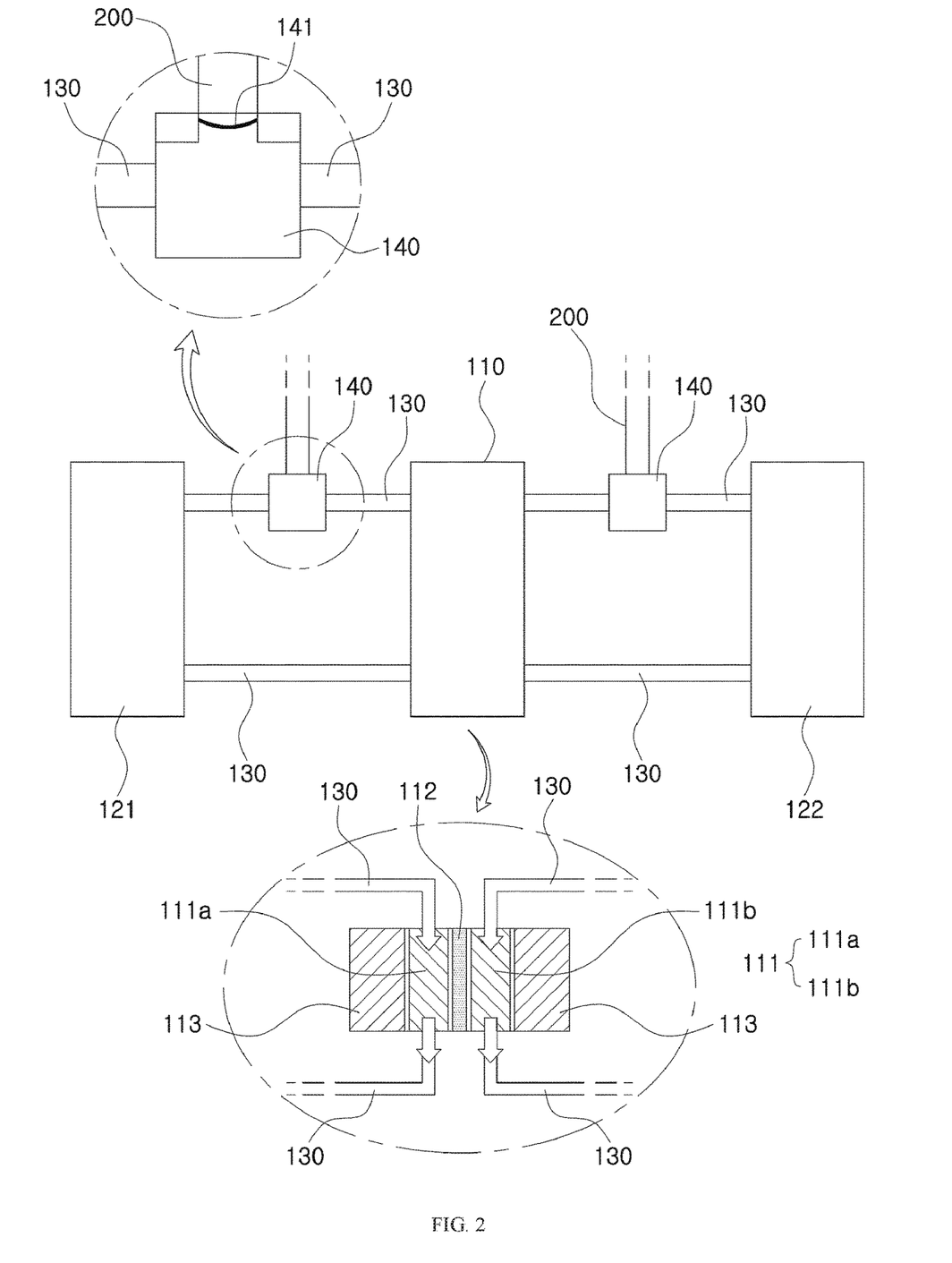
FIG. 2 is a view illustrating an internal structure of the battery module in a redox flow battery according to the present invention.

FIG. 1 is a view illustrating an example in which multiple battery modules are provided in a redox flow battery according to the present invention, and FIG. 2 is a view illustrating an internal structure of the battery module in a redox flow battery according to the present invention.

FIGS. 1 and 2 are schematic structural diagrams illustrating the structure of a redox flow battery according to the present invention. Referring to FIGS. 1 and 2, a stack 10 is configured to include one or more battery modules 10 and an electrolyte control unit 200, in which each of the battery modules 100 includes a battery cell 110, an electrolyte tank 120, an electrolyte flow path 130, and an electrolyte transfer part 140.

Referring to FIGS. 1 and 2, the battery cell 110 is configured to include a membrane 112 interposed between a positive electrode 111a and a negative electrode 111b composing a pair of electrodes 111, and a bipolar plate 113 spaced apart from the outside of each of the electrode 111, in which the battery cell 110 has a flow path formed therein so that the anode electrolyte and the cathode electrolyte is alternatively supplied.

That is, when the electrolyte is to be transported by the operation of the electrolyte control unit 200 which will be described later, the electrolyte is transferred from the electrolyte tank 120 to the battery cell 110 through the electrolyte flow path 130 to be circulated.

Through this circulation process, it is possible to perform charging and discharging.

Meanwhile, the battery cell 110 herein is described and illustrated on the basis of a typical redox flow battery, and configurations of the electrode 111, the membrane 112, or the bipolar plate 113 may be omitted, depending on the design conditions.

The electrolyte tank 120 is provided inside the battery module 100, connected to the battery cell 110 through the electrolyte flow path 130 to be described later, and configured to include an anode electrolyte tank 121 in which the anode electrolyte is circulated and a cathode electrolyte tank 122 in which the cathode electrolyte is circulated.

Depending on the design conditions, the electrolyte tank 120 is provided in each of the battery module 100 or connected to multiple battery modules 100 through the electrolyte flow path 130 to be described later so that the multiple battery modules 100 may be connected to share the electrolyte tank 120.

For example, two or more battery modules 100 are connected to one electrolyte tank 120 through the respective electrolyte flow paths 130, so that the electrolyte of the electrolyte tank 120 may be transferred to each of the two or more battery modules 100 through the respective electrolyte flow paths 130 and then circulated.

The electrolyte flow path 130 connects the battery cell 110 to the electrolyte tank 120 to provide a space in which the electrolyte flows, and as shown in FIGS. 1 and 2, a pair of flow paths are formed so that the anode electrolyte and the cathode electrolyte are supplied and discharged between the anode electrolyte tank 121 and the battery cell 110 and between the cathode electrolyte tank 122 and the battery cell 110, respectively.

Thus, the anode electrolyte of the anode electrolyte tank 121 is supplied to the battery cell 110 along one of the pair of flow paths, the anode electrolyte passing through the battery cell 110 is discharged along other flow path and then introduced into the anode electrolyte tank 121, thereby enabling the anode electrolyte to be circulated.

In addition, the cathode electrolyte of the cathode electrolyte tank 122 is supplied to the battery cell 110 along one of the pair of flow paths, and the cathode electrolyte passing through the battery cell 110 is discharged along the other flow path and then introduced into the cathode electrolyte tank 122, thereby enabling the cathode electrolyte to be circulated.

Thus, the battery cell 110 including the positive electrode 111a, the negative electrode 111b, the membrane 112, and the bipolar plate 113 is provided such that the anode electrolyte and the cathode electrolyte circulated from the anode electrolyte tank 121 and the cathode electrolyte tank 122 electrochemically react with each other in the battery cell 110, whereby charging or discharging is performed.

Referring to FIGS. 1 and 2, the electrolyte transfer part 140 is provided in the electrolyte transfer part 140 and serves to control the flow of the anode electrolyte and the cathode electrolyte through the electrolyte control unit 200 which will be described below. The electrolyte transfer part 140 may be made in the form of a housing having a space therein, and configured to include a diaphragm 141.

The diaphragm 141 is provided inside the electrolyte transfer part 140 and stretched by the electrolyte control unit 200 which will be described, thereby changing the pressure in the electrolyte transfer part 140.

The diaphragm 141 is provided inside the electrolyte transfer part 140 and stretched via the operation of the electrolyte control unit 200 which is provided in the outer side thereof. The diaphragm 141 is preferably made of a material which is excellent in watertightness and elasticity. When the electrolyte control unit 200 to be described below is operated, the diaphragm 141 is stretched inward or outward of the electrolyte transfer part 140, thereby changing the pressure inside the electrolyte transfer part 140. The electrolyte may flow through the electrolyte flow path 130 by such pressure change in the electrolyte transfer part 140.

Herein, the diaphragm 141 does not limit types of materials. For example, the diaphragm 141 may be made of a material such as rubber, and materials that are excellent in watertightness and elasticity, for example, fluororubber (trade name Viton) such as tetrafluoroethylene and perfluoromethyl vinyl ester, ethylene propylene terpolymer (EPDM), and the like.

In addition, the shape of the diaphragm capable of being used in the present invention is not limited when a shape capable of transmitting the pressure described herein, such as a flat shape, a specific concave-convex shape, or a bellows shape. Alternatively, in addition to the valve, it is possible to apply a structure that changes the pressure inside the electrolyte transfer part by reciprocating motion while being sealed, such as a piston (not shown in the drawing)

Figure 3:
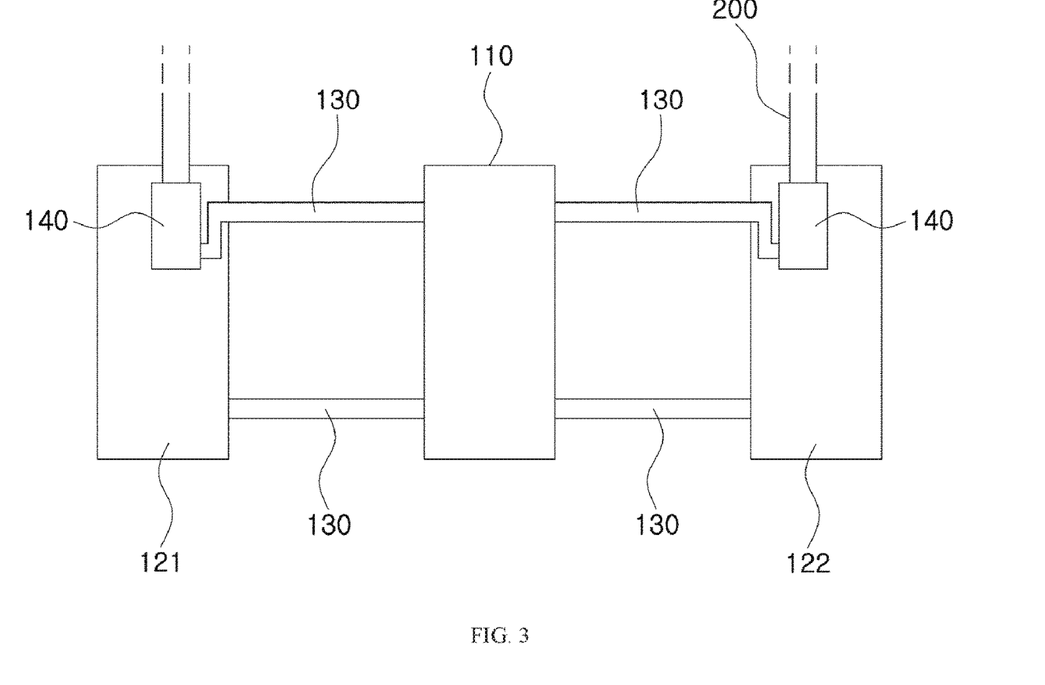
FIG. 3 is a view illustrating an example in which an electrolyte transfer part is provided in an electrolyte tank in a redox flow battery according to the present invention.

Meanwhile, although the redox flow battery according to the present invention is provided so that the electrolyte transfer part 140 is provided in the electrolyte flow path 130 connecting the battery cell 110 with the electrolyte tank 120, as shown in FIGS. 1 to 2, the electrolyte transfer part 140 may be located inside the electrolyte tank 120, as shown in FIG. 3.

Thus, when a positive pressure is transferred to the electrolyte transfer part 140 through the operation of the electrolyte control unit 200 to be described later, the electrolyte in the electrolyte transfer part 140 is transmitted to a battery cell 110 through the electrolyte flow path 130, and the level of the electrolyte in the electrolyte transfer part 140 is naturally lowered, so that the difference between the electrolyte level inside the electrolyte transfer part 140 and the electrolyte level outside the external electrolyte, that is, inside the electrolyte tank 120 is generated. Herein, when the level of the electrolyte is lowered and the supply of the positive pressure is stopped, the electrolyte inside the electrolyte tank 120 inflows into the electrolyte transfer part 140 through the height difference of the electrolyte, whereby it is possible to minimize the supply of the negative pressure required for the electrolyte inflow, thereby obtaining a large effect even with less energy. It is possible that the electrolyte inflows into the electrolyte transfer part 140 without supplying negative pressure, thereby improving the battery efficiency.

Herein, the circulation of the anode electrolyte or the cathode electrolyte may be made by the operations of the electrolyte transfer part 140 and the electrolyte control unit 200 that controls the flow of the electrolyte.

The electrolyte control unit 200 serves to control the flow of electrolyte of each of one or more battery modules 100. Preferably, the electrolyte control unit 200 performs a function of changing the pressure in the electrolyte transfer part 140 by stretching the diaphragm 141 of the electrolyte transfer part 140, in which the pressure in the electrolyte transfer part 140 is changed through the operation of the electrolyte control unit 200 to allow the electrolyte to flow.

Here, the transferring of the electrolyte from the electrolyte transfer part 140 along the electrolyte transfer path 130 may be due to a principle according to the pressure difference in the electrolyte transfer part 140.

That is, when the diaphragm 141 is stretched inward of the electrolyte transfer part 140 so that the pressure in the electrolyte transfer part 140 is lowered, the negative pressure acts, whereby the electrolyte inflows into the electrolyte transfer part 140, so as to maintain the pressure balance in the electrolyte transfer part 140. On the contrary, when the diaphragm 141 is stretched outward of the electrolyte transfer part 140 so that the pressure in the electrolyte transfer part 140 increases, the positive pressure acts, whereby the electrolyte in the electrolyte transfer part 140 naturally inflows into the battery cell 110 along the electrolyte flow path 130.

Through the repetition of this process, the electrolyte inflows into the battery cell 110 and then circulated.

Hereinafter, with reference to FIGS. 4 to 6, the electrolyte control unit 200 will be described in detail.

Figure 4:
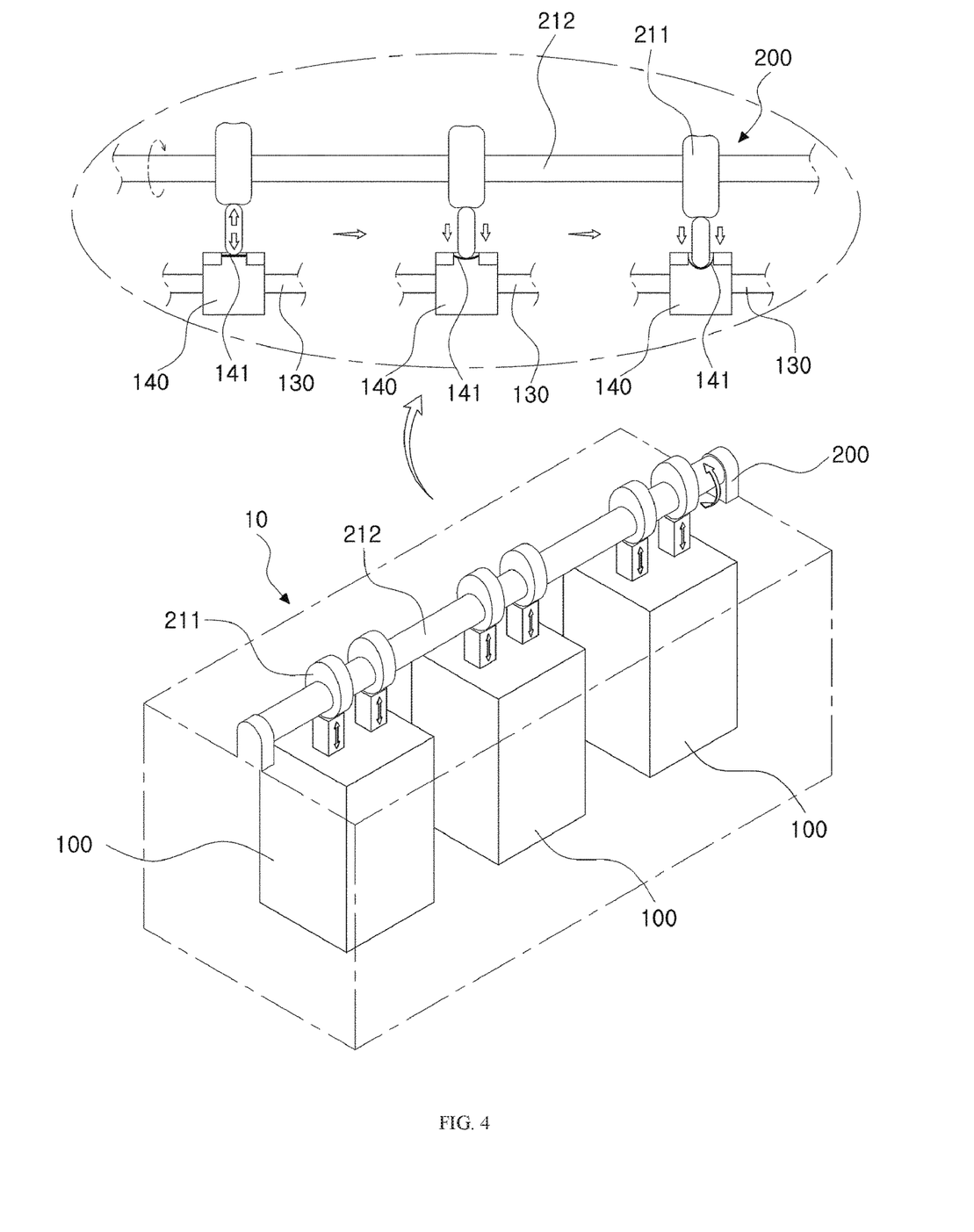
FIG. 4 is a view illustrating an example of an electrolyte transfer part and an electrolyte control unit that independently circulate the electrolyte of each of one or more battery modules in a redox flow battery according to the present invention.

FIG. 4 is a view illustrating an example of an electrolyte transfer part and an electrolyte control unit that independently circulate the electrolyte of each of one or more battery modules in a redox flow battery according to the present invention.

Referring to FIG. 4, the electrolyte control unit 200 is to repeatedly press the diaphragm 141 provided in each of the one or more battery modules 100 to cause the diaphragm 141 to be stretched, and is configured to include a cam member 211 and a rotation shaft 212.

The cam member 211 is provided outside the electrolyte transfer part 140 which is provided on each of the one or more battery modules 100 provided in the stack 10, and performs a function of repeatedly pressurizing the diaphragm 141 provided in the electrolyte transfer part 140 during eccentric rotation with respect to the axis of rotation, whereby the diaphragm 141 is stretched inward of the electrolyte transfer part 140 or stretched outward of the electrolyte transfer part 140.

As shown in FIG. 4, the cam member 211 is preferably provided in each of one or more battery modules 100, and multiple cam members 211 share a rotating shaft 212 to be described later, and thus are connected to the rotating shaft 212.

The rotating shaft 212 is connected to the multiple cam members 211 to cause the multiple cam members 211 to be eccentrically rotated, and is preferably provided in the stack 10 as shown in FIG. 4, thereby allowing the diaphragm 141 of the electrolyte transfer part 140 provided in each of the one or more battery modules 100 provided in the stack 10 to be pressurized and stretched.

That is, when the rotating shaft 212 is rotated, the multiple cam members 211 connected to the rotating shaft 212 are eccentrically rotated so that the diaphragm of the electrolyte transfer part 140 provided in each battery module 100 is pressurized. As the stretching of the diaphragm 141 is repeatedly performed, each of the battery modules 100 may be independently charged and discharged by circulation of the electrolyte due to the pressure change in the electrolyte transfer part 140. Herein, the cam member and the valve may be mechanically coupled to each other, such as by a linkage or direct coupling, or the aforementioned electrolyte transfer part may be driven without being coupled.

Figure 5:
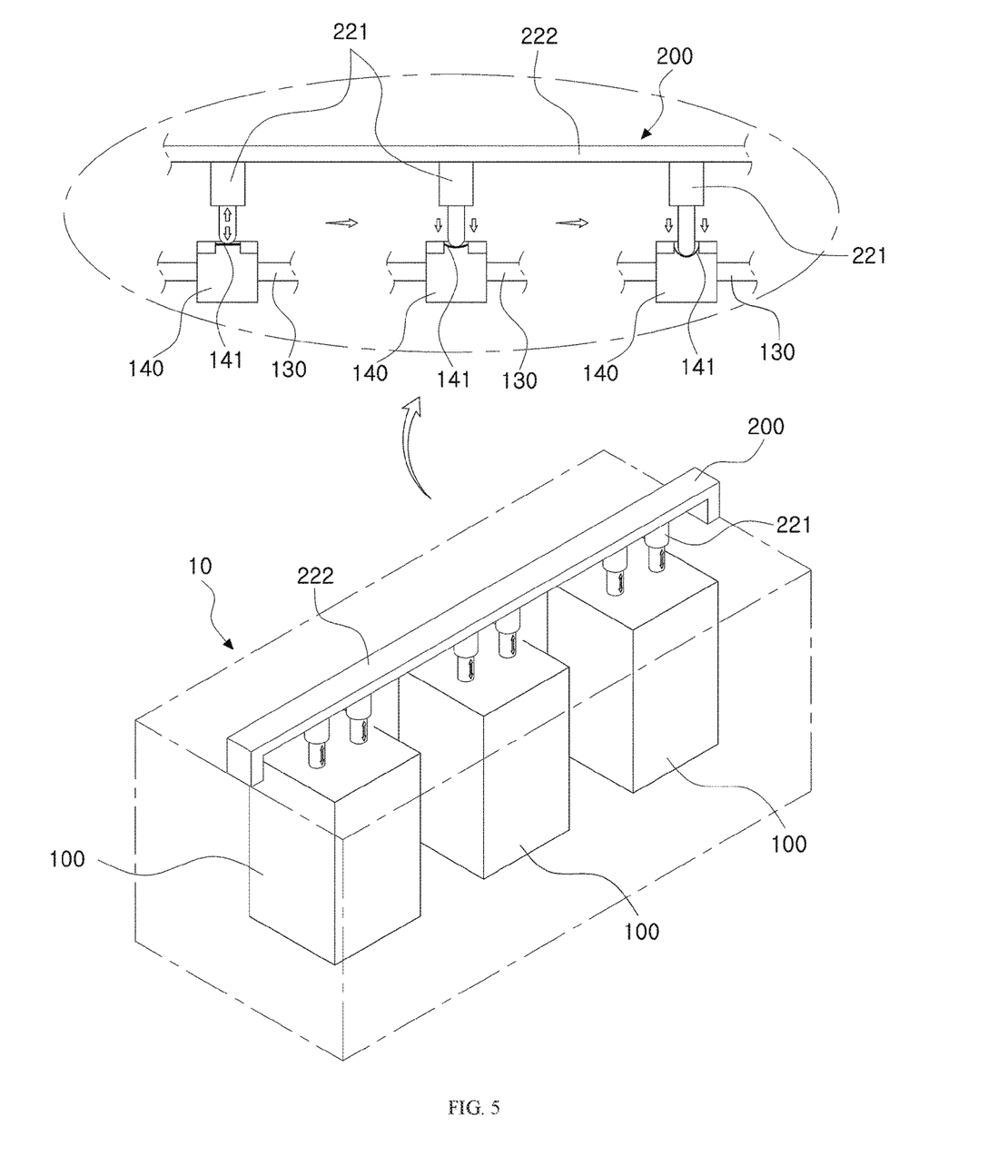
FIG. 5 is a view illustrating another example of an electrolyte transfer part and an electrolyte control unit, that independently circulate the electrolyte of each of one or more battery modules in a redox flow battery according to the present invention.

FIG. 5 is a view illustrating another example of an electrolyte transfer part and an electrolyte control unit, which independently circulate the electrolyte of each of one or more battery modules in a redox flow battery according to the present invention.

Referring to FIG. 5, another example of an electrolyte control unit 200 will be described. The electrolyte control unit 200 may be configured with a piezo actuator 221 that repeatedly pressurizes the diaphragm 141 provided in each of the one or more battery modules 100.

Here, the piezo actuator 221 is a positioning element that applies the piezoelectric effect, and has constant operating frequency (repetitive operation) and excellent accuracy, whereby there is an advantage that accurate positioning may be performed from a few nanometers to hundreds of microns.

In detail, the piezo actuator 221 is a type of actuator using the principle of piezoelectric effect, in which when a voltage is applied, deformation is generated in proportion to voltage.

Multiple piezo actuators 221 are provided in such a manner as to be coupled to the support shaft 222 provided in the stack 10, as shown in FIG. 5.

Since the multiple piezo actuators 221 are provided in such a manner as to be coupled to the support shaft 222, it is possible to maintain the same height as the diaphragm 141 of each of the one or more battery modules 100 provided in the stack 10 and thus ensure that the flow of the electrolyte is fine and accurate through control of the diaphragm 141.

More specifically, the redox flow battery according to the present invention utilizes the piezo actuator 221 to stretch the diaphragm 141 of the electrolyte transfer part 140 which is provided in each of the one or more battery module 100 in the stack 10, whereby the diaphragm 141 provided in the electrolyte transfer part 140 is repeatedly pressurized by utilizing the principle that the actuator has a variable length through the supply of voltage to the piezo actuator 221. Accordingly, as the diaphragm 141 is stretched, the electrolyte may be transported and thus eventually circulated.

In detail, as shown in FIG. 5, when the voltage is supplied to the piezo actuator 221, the length is repeatedly varied, and the diaphragm 141 of the electrolyte transfer part 140 is repeatedly pressurized according to the varied length, whereby a process of stretching the diaphragm 141 inward and outward of the electrolyte transfer part 140 is repeated so that the pressure inside the electrolyte transfer part 140 is changed to allow the electrolyte to be transferred.

Accordingly, the electrolyte is circulated by varying the pressure in the electrolyte transfer part 140 provided in each of one or more battery modules 100 provided in the stack 10, so that each of the battery modules 100 may be independently charged and discharged.

Figure 6:
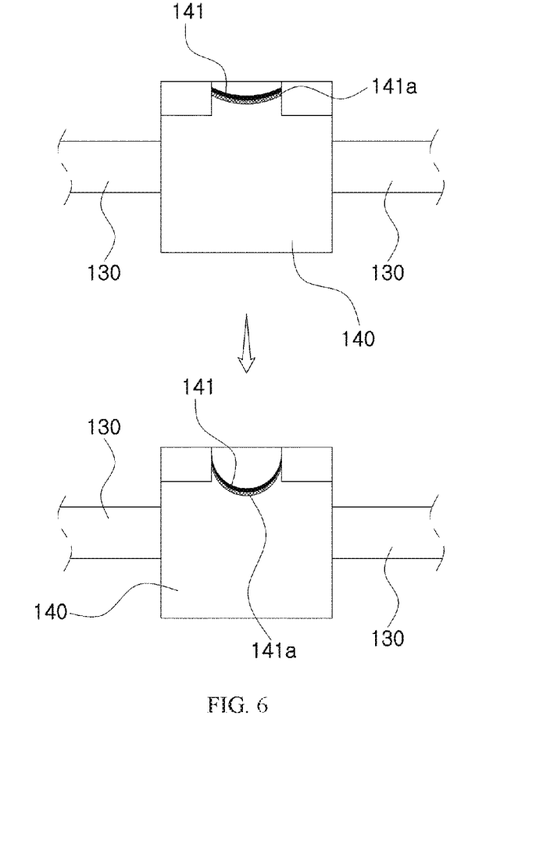
FIG. 6 is a view illustrating another example of an electrolyte transfer part and an electrolyte control unit that independently circulate the electrolyte of each of one or more battery modules in the redox flow battery according to the present invention.

FIG. 6 is a view illustrating another example of an electrolyte transfer part and an electrolyte control unit that independently circulates the electrolyte of each of one or more battery modules in the redox flow battery according to the present invention.

Another example of an electrolyte transfer part 140 and an electrolyte control unit 200 will be described with reference to FIG. 6. The electrolyte transfer part 140 is provided with a diaphragm 141, and the diaphragm 141 may be made of a piezo element.

In addition, although the electrolyte control unit 200 is not shown in the drawings, it may be made of a separate power supply means capable of supplying a voltage to the diaphragm 141 made of a piezo element.

Here, the piezo element is operated on the basis of the same principle as the piezo actuator 221 described above, in which the deformation is generated in proportion to the voltage supplied.

That is, by supplying a voltage to the diaphragm 141 made of a piezo element, the diaphragm 141 is stretched inward of the electrolyte transfer part 140, as shown in FIG. 6, so that the pressure in the electrolyte transfer part 140 is changed and thus the electrolyte is transferred according to the pressure change.

Herein, the diaphragm 141 made of a piezo element is preferably made of a concave shape inward of the electrolyte transfer part 140, as shown in FIG. 6.

This, when the diaphragm 141 made of a piezo element is provided in a straight form or a convex shape outward of the electrolyte transfer part 140, the influence on the pressure change and the electrolyte in the electrolyte transfer part 140 is insufficient because the diaphragm 141 is stretched outward of the electrolyte transfer part 140 by the supply of voltage. Thus, the diaphragm 141 has the concave shape inward to prevent the problem. As shown in FIG. 6, the diaphragm 141 is formed in a concave shape inward of the electrolyte transfer part 140, so that the diaphragm 141 is always stretched inward of the electrolyte transfer part 140, that is, in one direction, by the supply of voltage, whereby the pressure change and the electrolyte transfer in the electrolyte transfer part 140 may be performed more efficiently and accurately.

Depending on the design conditions, a coating layer 141*a* may be formed on the surface of the diaphragm 141 made of the piezo element.

The coating layer 141*a* is coated on the surface of the diaphragm 141 to protect the diaphragm 141 and ensure excellent acid resistance, in order to complement the acid-vulnerable properties of the piezoelectric element.

Accordingly, it is possible to prevent a problem that the redox flow battery does not function properly as a part of the diaphragm 141 is failed or damaged.

Herein, the coating layer 141*a* may be formed with an acid resistant coating, and may be made of one or more acid resistant coatings selected from the group consisting of silicon compounds, boron compounds, and aluminum compounds. Preferably, the redox flow battery according to the present invention is provided so that the diaphragm 141 made of a piezo element is stretched, in which the coating layer 141*a* may be formed of any coating agent, if the coating agent is excellent in acid resistance while preventing the coating layer 141*a* from being separated or lost while the valve 141 is stretched.

In addition, in the redox flow battery according to the present invention, methods of using a cam, a diaphragm, a piston, a piezo, and a piezo diaphragm for driving the electrolyte transfer part have been described, it is also possible to apply one or more of these means in combination. For example, two methods may be combined by using the piezo diaphragm while using the cam structure. Accordingly, it is possible to select a suitable method of two methods according to the situation, by which the electrolyte transfer part is driven only by the piezo diaphragm when the required flow rate of electrolyte is low, and the electrolyte transfer part is driven only by the cam or driven by the cam and piezo diaphragm together when the required flow rate of electrolyte is increased.

Hereinafter, an example in which a configuration of a valve 142 for adjusting a direction in which an electrolyte flows in a redox flow battery according to the present invention is added will be described with reference to FIGS. 7 to 9.

First, it is noted that the same content as described in FIGS. 1 to 6 is not mentioned.

Referring to an example in which the configuration of the valve 142 is added in the redox flow battery according to the present invention, the battery module 100 is added, the battery module 100 is configured to include a battery cell 110, an electrolyte tank 120, and electrolyte flow path 130, and an electrolyte transfer part 140, in which the electrolyte transfer part 140 has a valve 142 which induces the flow of the electrolyte in one direction.

Figure 7:
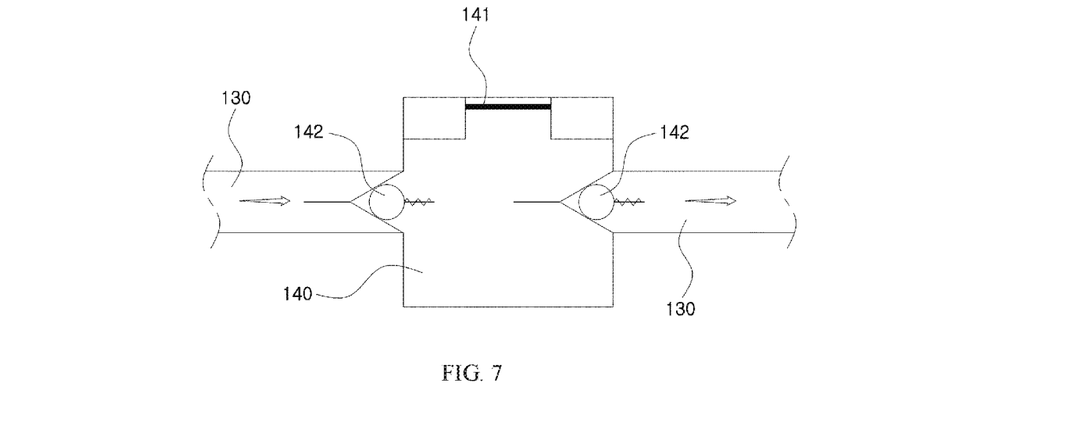
FIG. 7 is a view illustrating an example of a valve provided in an electrolyte transfer part in a redox flow battery according to the present invention.

FIG. 7 is a view illustrating an example of a valve provided in the electrolyte transfer part in a redox flow battery according to the present invention.

Referring to FIG. 7, an example of the valve 142 will be described. The valves are provided on both sides of the electrolyte transfer part 140, and one pair of valves is included in the electrolyte flow path 130.

The valve 142 is preferably configured with a non-return valve, and is operated so that the flow of the electrolyte is guided in one direction.

Herein, as shown in FIG. 7, the valve 142 may be composed of a pair of check valves. When the pressure in the space inside the electrolyte transfer part 140, that is, the space pressure between the pair of check valves is operated (negative pressure) to be lowered by the operation of the electrolyte control unit 200, the space pressure between the pair of check valves is naturally lowered. Therefore, in order to maintain pressure equilibrium, the electrolyte flows into the electrolyte transfer part 140 through one check valve provided on the side of the electrolyte flow path 130 by which the electrolyte is flowed into the electrolyte transfer part 140, and the other check valve provided on the side of the electrolyte flow path 130 by which the electrolyte is discharged from the electrolyte transfer part 140 is closed, thereby preventing the reverse flow of the electrolyte.

In addition, when the electrolyte control unit 200 is operated (positive pressure) so that the pressure of the space inside the electrolyte transfer part 140, that is, space between the pair of check valves is increased, the electrolyte in the electrolyte transfer part 140 inflows into the battery cell through the other check valve, and one check valve 142 is closed.

By repeating this process, the electrolyte is transferred from the electrolyte tank 120 to the battery cell 110, and transferred from the battery cell 110 to the electrolyte tank 120 back, whereby the electrolyte is circulated in one direction.

Figure 8:
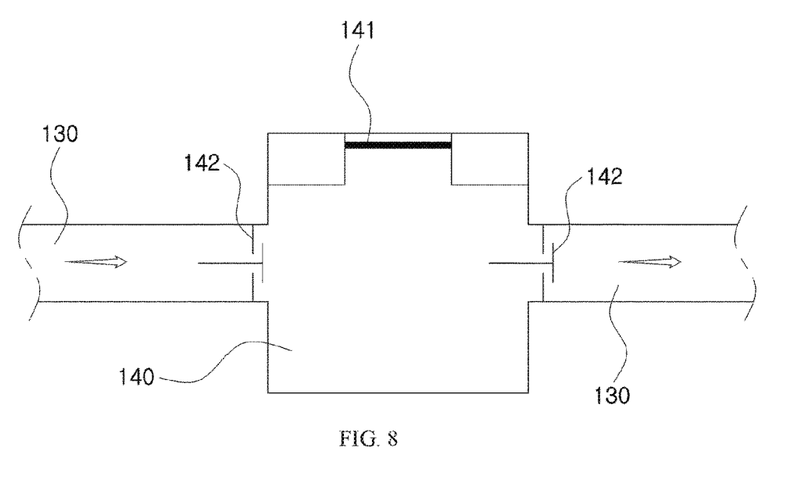
FIG. 8 is a view illustrating another example of a valve provided in an electrolyte transfer part in a redox flow battery according to the present invention.
Figure 9:
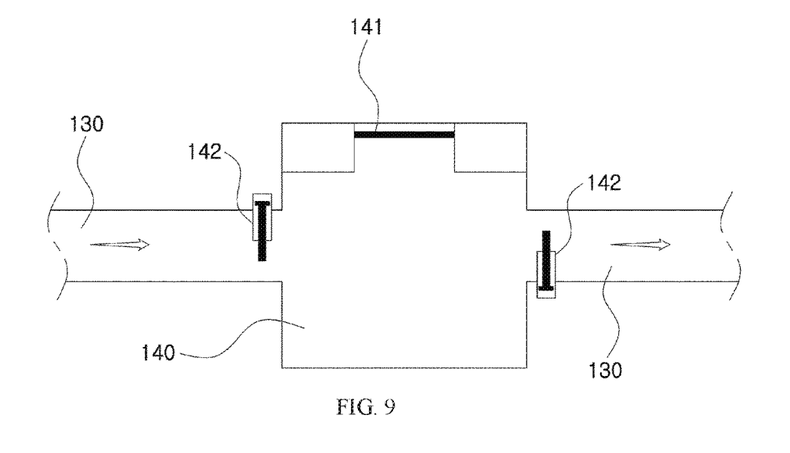
FIG. 9 is a view illustrating another example of a valve provided in an electrolyte transfer part in a redox flow battery according to the present invention.

Herein, the configuration of the valve 142 is made of a valve in the form of a disk, as shown in FIG. 8, in addition to the check valve shown in FIG. 7, or made of a valve operated by pressure as shown in FIG. 9.

The valve in the form of a disk or the valve operated by pressure is operated in the same way as the check valve. The flow resistance is higher in the reverse direction than in the forward direction in the flow of the electrolyte, so that the electrolyte generally flows in the forward direction, thereby allowing the circulation of the electrolyte to proceed in one direction.

According to the design conditions, various embodiments of the valve are described referring to FIGS. 7 to 9, the present invention is not limited thereto. As long as the valve is provided in the electrolyte flow path 130 or the electrolyte transfer part 140 to cause the electrolyte to flow in one direction, the valve may be of any configuration.

In addition, FIGS. 7 to 9 illustrate a form in which a pair of valves 142 is provided. In general, the inside of the battery cell 110 has a high fluid flow resistance, and only one valve 142 may be provided in the electrolyte flow path 130, according to necessity.

As such, when the electrolyte flows through the electrolyte transfer part 140 and the electrolyte control unit 200, the flow of the electrolyte may be induced in one direction using the valve 142 to prevent the reverse flow, whereby the redox flow battery can be efficiently charged and discharged according to the circulation of the electrolyte.

Depending on the design conditions, when there are problems that the diaphragm 141 provided in the electrolyte transfer part 140 is damaged or the pressure is not easily changed during controlling the pressure in the electrolyte transfer part 140 to control the flow of the electrolyte, a pressure gauge (not shown) may be further provided to measure the same.

Accordingly, when the loss of pressure occurs through the pressure gauge, the detection and notification thereof is performed so that the administrator may recognize the same, to make it possible to supplement the lost pressure or check and repair various configurations.

According to this configuration, the redox flow battery according to the present invention has one or more battery modules including the battery cell 110, the electrolyte tank 120, the electrolyte flow path 130, and the electrolyte transfer part 140 though which electrolyte flows, and further has an electrolyte control unit 200 that controls the flow of the electrolyte, whereby each of the battery modules 100 is charged and discharged by independently circulating the electrolyte.

In addition, the diaphragm is provided to control the pressure inside the electrolyte transfer part, the diaphragm being repeatedly pressurized through the electrolyte control unit so that the pressure inside the electrolyte transfer part may be controlled, whereby the electrolyte is circulated through the sealed structure composed of the battery cell, the electrolyte tank, the electrolyte flow path, and the electrolyte transfer part, thereby reducing the reaction time, minimizing the generation of shunt current, and improving the efficiency.

In addition, since there is no need to drive a motor or pump to circulate the electrolyte for each battery module 100, the energy efficiency may be increased, the circulation distance of the electrolyte is reduced to increase the responsiveness of the battery and minimize the use of acid-resistant piping.

Meanwhile, the redox flow battery according to the present invention has been described as an example of an independent configuration composed of the battery cell 110, the electrolyte tank 120, the electrolyte flow path 130, and the electrolyte transfer part 140, in which the electrolyte tank 120 and the electrolyte transfer part 140 may be provided to be used in common and multiple battery cells 110 may be included.

This will be described in detail with reference to FIG. 10.

Figure 10:
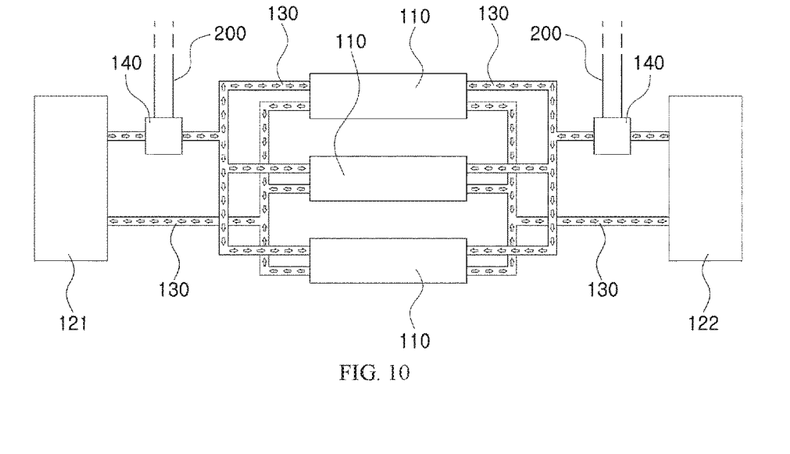
FIG. 10 is a view illustrating an example in which the electrolyte is moved through the electrolyte tank, the electrolyte transfer part, and the electrolyte control unit independently configured in multiple battery cells in a redox flow battery according to the present invention.

FIG. 10 is a view illustrating an example in which the electrolyte is moved through the electrolyte tank, the electrolyte transfer part, and the electrolyte control unit independently configured in multiple battery cells in the redox flow battery according to the present invention.

As shown in FIG. 10, the battery module is configured so that multiple battery cells 110 are provided, the multiple battery cells 110 are connected to the anode electrolyte tank 121 and the cathode electrolyte tank 122 through the electrolyte flow path 130, and the electrolyte transfer part 140 controlling the flow of fluid is provided in each of the electrolyte flow path 130 connected to the anode electrolyte tank 121 and the electrolyte flow path 130 connected to the cathode electrolyte tank 122.

Herein, when the electrolyte control unit 200 is operated, the diaphragm 141 of the electrolyte transfer part 140 is stretched, in which due to the pressure change in the electrolyte transfer part 140, the anode electrolyte is circulated through the anode electrolyte tank 121, the electrolyte flow path 130, and the multiple battery cells 110, and the cathode electrolyte is circulated through the cathode electrolyte tank 122, the electrolyte flow path 130, and the multiple battery cells 110, so that each of the multiple battery cells 110 may be independently charged or discharged, or multiple battery cells are coupled in a stack shape while sharing the configurations except the battery cell 110.

Figure 11:
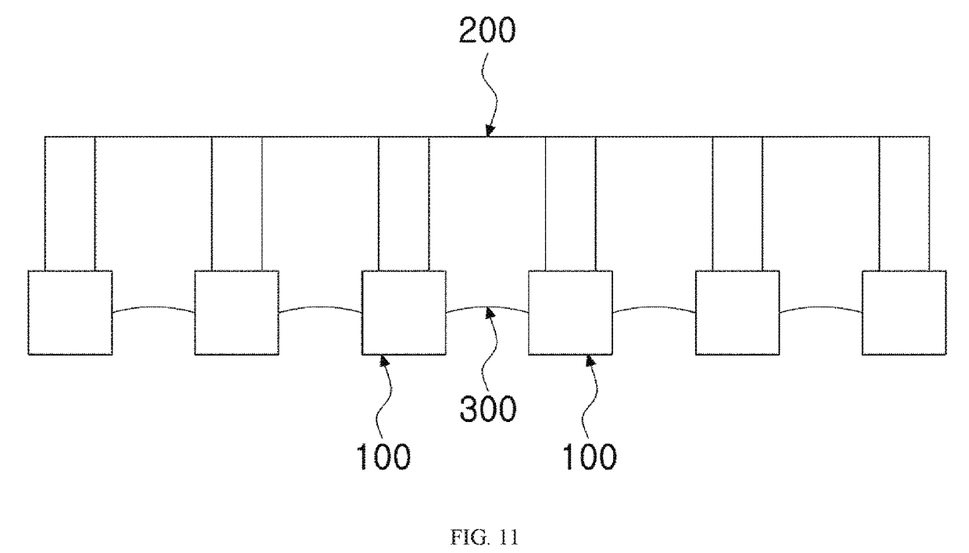
FIG. 11 is a view illustrating an example in which a module connection unit is provided in a redox flow battery according to the present invention.

According to the design conditions, the redox flow battery according to the present invention may further include a module connection unit 300 that electrically connects between multiple battery modules 100 provided in the stack 10.

Referring to FIG. 11, the module connection unit 300 electrically connects the multiple battery modules 100 to perform a function of allowing the battery modules 100 to electrically communicate with each other.

Herein, the module connection unit 300 is preferably made of a conductive material, and is used with wires made of aluminum or copper depending on the design conditions.

Further, a wire made of gold or plated with gold may be used to prevent corrosion of the wires, and any conductor may be used as long as it is electrically conductive.

In some cases, the battery modules 100 may be configured in such a manner as to be driven independently without an electrical connection between the battery modules 100, and a desired output may be configured through a serial or parallel connection.

According to this configuration, the redox flow battery according to the present invention can circulate the electrolyte independently to minimize the generation of shunt current without any interference or exchanges of electrolyte between multiple battery modules 100. Alternatively, several battery modules 100 share the electrolyte tank 120 to circulate the electrolyte, the battery module having a battery cell 110, an electrolyte transfer part 14, and an electrolyte flow path 130. Several battery modules share one anode electrolyte tank and one cathode electrolyte tank to be driven, thereby minimizing the generation of shunt current.

In the above description, various embodiments of the present invention have been described and described, but the present invention is not necessarily limited thereto, and a person having ordinary skill in the art to which the present invention pertains will understand that various substitutions, modifications, and changes can be made therein without departing from the technical spirit of the present invention.

The invention claimed is:

1. A redox flow battery, comprising:
   a plurality of battery modules each including a battery cell, an electrolyte tank, an electrolyte flow path, and an electrolyte transfer part; and
   an electrolyte control unit controlling electrolyte flow of the plurality of battery modules,
   wherein the plurality of battery modules are charged and discharged by independently circulating an electrolyte for each the plurality of battery modules or a predetermined number of battery modules through the electrolyte control unit.

2. The redox flow battery of claim 1, wherein each of the plurality of battery modules is configured to include:
   one or more battery cells each having a pair of electrodes divided into a positive electrode and a negative electrode, a membrane interposed between the electrodes, and a bipolar plate stacked on an outer surface of each of the electrodes;
   the electrolyte tank connected to the one or more battery cells and having an anode electrolyte tank for causing an anode electrolyte to be circulated and a cathode electrolyte tank for allowing a cathode electrolyte to be circulated;
   the electrolyte flow path connecting the battery cell and the electrolyte tank; and
   the electrolyte transfer part provided in the electrolyte flow path to control flows of the anode electrolyte and the cathode electrolyte.

3. The redox flow battery of claim 1, wherein the electrolyte transfer part is provided in the electrolyte flow path connecting the battery cell and the electrolyte tank or connected to one end of the electrolyte flow path to be provided in the electrolyte tank.

4. The redox flow battery of claim 1, wherein the electrolyte transfer part includes a diaphragm adjusting a pressure inside.

5. The redox flow battery of claim 4, wherein the electrolyte control unit includes a cam member repeatedly pressurizing the diaphragm provided in each of the one or more battery modules.

6. The redox flow battery of claim 5, wherein a rotating shaft that is connected to multiple cam members to cause the multiple cam members to be eccentrically rotated is provided in a stack including the plurality of battery modules.

7. The redox flow battery of claim 4, wherein the electrolyte control unit includes a piezo actuator repeatedly pressurizing the diaphragm provided in each of the plurality of battery modules.

8. The redox flow battery of claim 4, wherein the diaphragm is made of a piezo element and controls a pressure inside the electrolyte transfer part by repeatedly supplying voltage.

9. The redox flow battery of claim 8, wherein the diaphragm is formed in a concave shape inward of the electrolyte transfer part, and has a coating layer formed on a surface thereof.

10. The redox flow battery of claim 1, wherein the electrolyte transfer part includes one or multiple valves inducing flow of the electrolyte in one direction.

11. The redox flow battery of claim 1, wherein the electrolyte transfer part includes a piston adjusting a pressure inside.

12. The redox flow battery of claim 1, wherein the electrolyte transfer part has two or more diaphragms, a cam member, a piezo actuator, a piezo diaphragm, and a piston.

13. The redox flow battery of claim 1, wherein the electrolyte transfer part is disposed inside the electrolyte tank.

14. The redox flow battery of claim 13, wherein the electrolyte transfer part is disposed inside the electrolyte tank in a way such that a horizontal center axis is positioned to be lower than that of the electrolyte flow path.

* * * * *